United States Patent
Coleman et al.

(10) Patent No.: US 8,231,180 B2
(45) Date of Patent: Jul. 31, 2012

(54) FABRICATED VEHICLE WHEEL AND METHOD FOR PRODUCING SAME

(75) Inventors: Alan Coleman, Southgate, MI (US); Joseph Wolf, Canton, MI (US); Thomas E. Heck, Monroe, MI (US); Todd Duffield, Westland, MI (US); John Holm, Superior Township, MI (US); Robert J. Wendt, White Lake, MI (US); Christopher A. Putz, Canton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 194 days.

(21) Appl. No.: 12/086,103

(22) PCT Filed: Dec. 7, 2006

(86) PCT No.: PCT/US2006/046708
§ 371 (c)(1),
(2), (4) Date: Apr. 23, 2009

(87) PCT Pub. No.: WO2008/010835
PCT Pub. Date: Jan. 24, 2008

(65) Prior Publication Data
US 2009/0212620 A1    Aug. 27, 2009

(51) Int. Cl.
*B60B 3/00* (2006.01)
(52) U.S. Cl. .............................. 301/63.104; 29/894.322
(58) Field of Classification Search .............. 301/63.103–63.107; 29/894.321–894.323
See application file for complete search history.

(56) References Cited

U.S. PATENT DOCUMENTS

| 4,438,979 A | * | 3/1984 | Renz et al. ................. 301/37.36 |
| 4,610,482 A | | 9/1986 | Overbeck et al. |
| 5,257,455 A | | 11/1993 | Iwatsuki |
| 5,295,304 A | | 3/1994 | Ashley, Jr. |
| 5,345,676 A | | 9/1994 | Ashley, Jr. |
| 5,360,261 A | | 11/1994 | Archibald et al. |
| 5,421,642 A | | 6/1995 | Archibald |
| 5,435,632 A | | 7/1995 | Gajor et al. |
| 5,435,633 A | | 7/1995 | Jaskierny |
| 5,509,726 A | | 4/1996 | Overbeck |
| 5,551,151 A | | 9/1996 | Overbeck |
| 5,558,407 A | | 9/1996 | Jaskiery |
| 5,564,792 A | * | 10/1996 | Archibald .................... 301/5.21 |
| 5,639,147 A | | 6/1997 | Hill et al. |
| 5,651,590 A | | 7/1997 | Word |
| 5,803,553 A | | 9/1998 | Wei |
| 6,024,415 A | * | 2/2000 | Stach ....................... 301/64.102 |

(Continued)

FOREIGN PATENT DOCUMENTS

WO    0143991 A1    6/2001

*Primary Examiner* — Jason Bellinger
(74) *Attorney, Agent, or Firm* — MacMillan, Sobanski & Todd, LLC

(57) ABSTRACT

A full face fabricated euroflange vehicle wheel comprises a full face wheel disc defining an axis and formed from a suitable material, the wheel disc having an outer end; and a wheel rim formed from a suitable material and having an outer end joined to the outer end of the wheel disc by at least one weld to produce the fabricated euroflange vehicle wheel; wherein the fabricated euroflange vehicle wheel includes only a generally radially outwardly extending outer end formed by a combination of at least a portion of two of the outer end of the wheel disc the outer end of the wheel rim and the at least one weld.

17 Claims, 14 Drawing Sheets

U.S. PATENT DOCUMENTS

| | | | |
|---|---|---|---|
| 6,030,051 A * | 2/2000 | Hosoda et al. | 301/63.105 |
| 6,036,280 A | 3/2000 | Stanavich | |
| 6,052,901 A | 4/2000 | Stegemann et al. | |
| 6,170,918 B1 | 1/2001 | Archibald et al. | |
| 6,193,321 B1 | 2/2001 | Cvijanovic et al. | |
| 6,209,204 B1 * | 4/2001 | Eikhoff | 29/894.381 |
| 6,240,638 B1 | 6/2001 | Archibald et al. | |
| 6,354,667 B1 | 3/2002 | Cochran et al. | |
| 6,370,777 B1 | 4/2002 | Heck | |
| 6,382,735 B2 | 5/2002 | Gonzalez et al. | |
| 6,447,071 B1 | 9/2002 | Griffin | |
| 6,508,517 B2 | 1/2003 | Mikami | |
| 6,641,224 B1 * | 11/2003 | Heck et al. | 301/13.2 |
| 7,347,505 B2 | 3/2008 | Rodrigues et al. | |
| 7,509,739 B2 * | 3/2009 | Okita et al. | 29/894.322 |
| 2001/0038238 A1 * | 11/2001 | Gonzalez et al. | 301/63.104 |
| 2002/0093242 A1 * | 7/2002 | Chase et al. | 301/37.43 |
| 2006/0043782 A1 * | 3/2006 | Houten | 301/37.43 |
| 2007/0062040 A1 * | 3/2007 | Coleman et al. | 29/894.381 |
| 2010/0301661 A1 * | 12/2010 | Heck et al. | 301/37.26 |

* cited by examiner

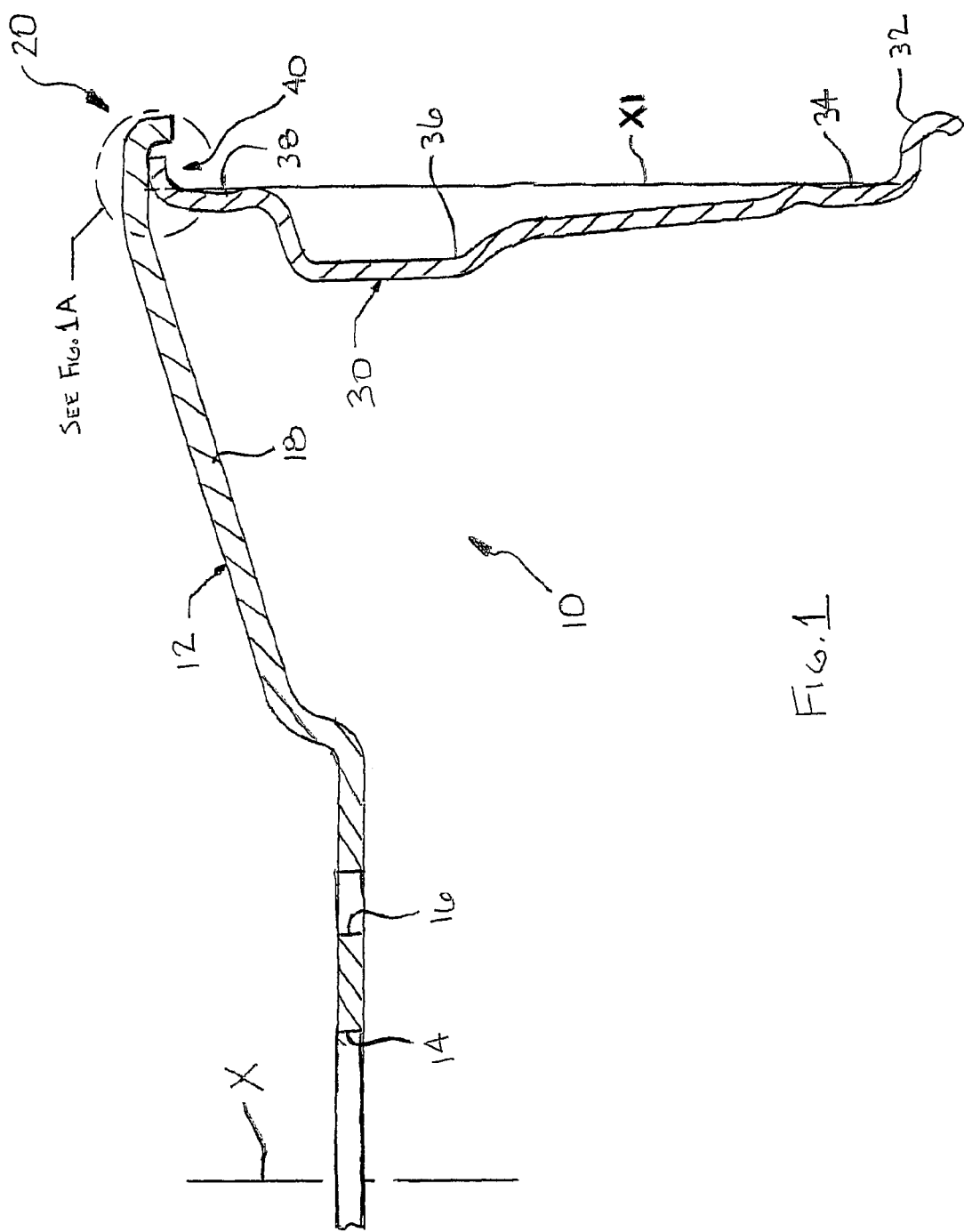

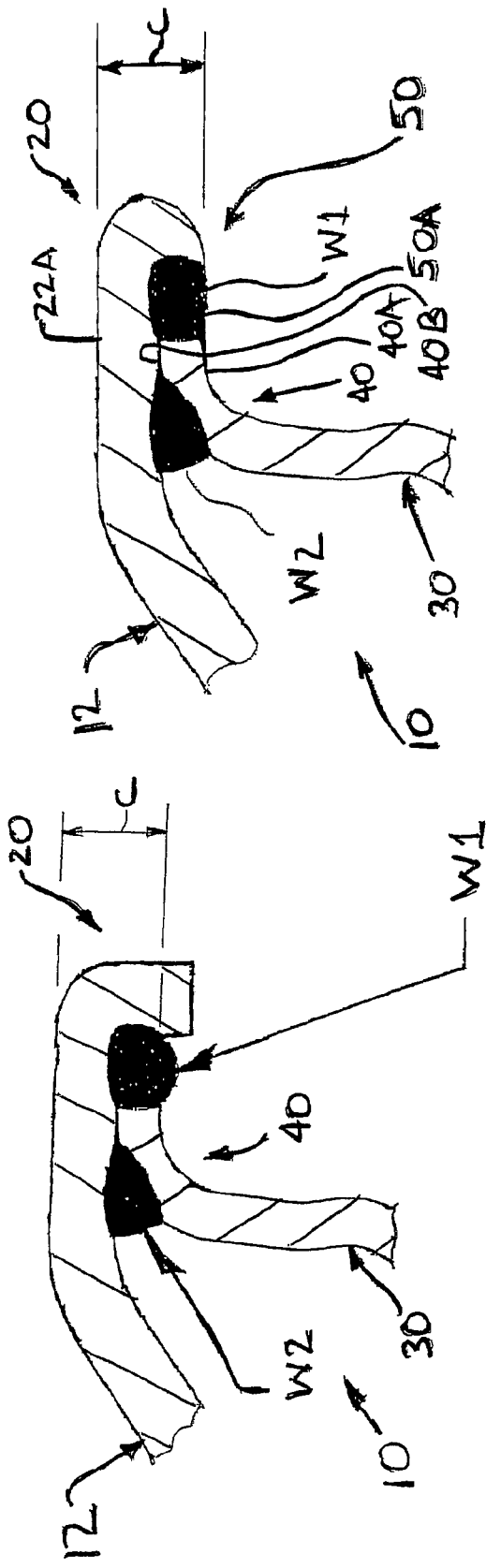

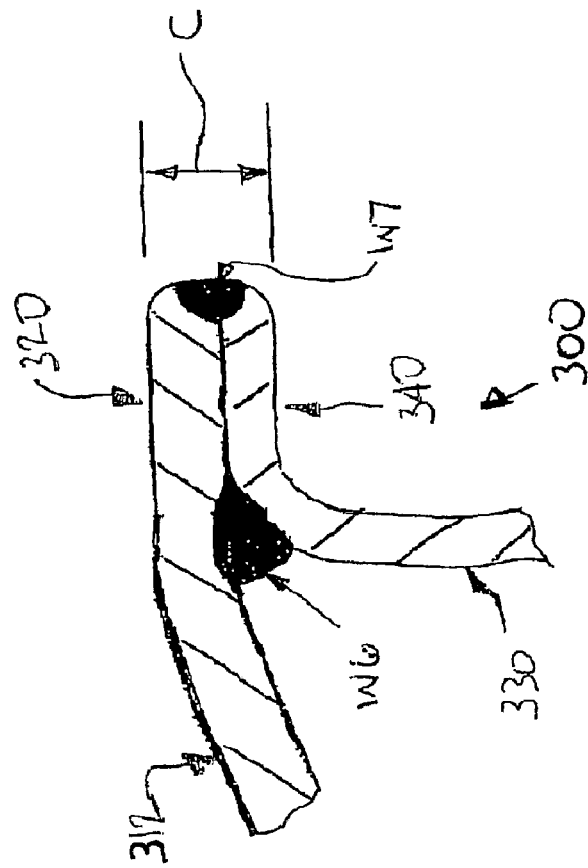
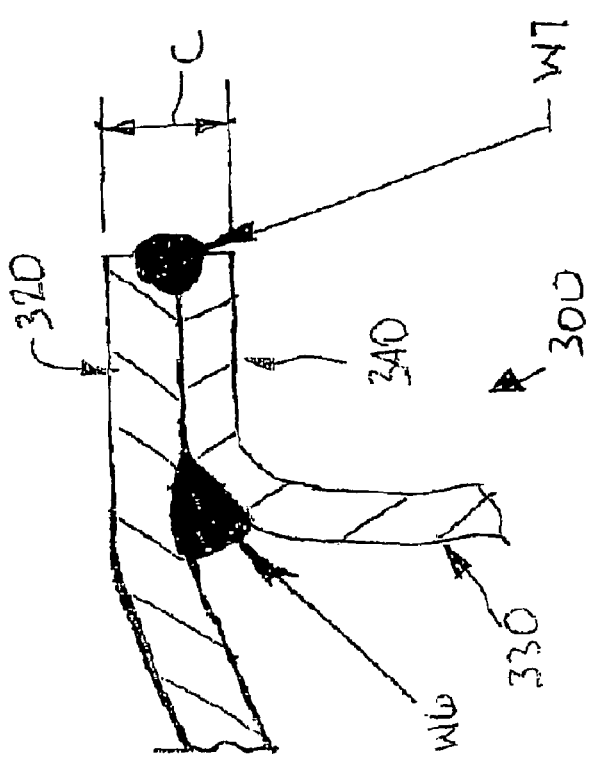

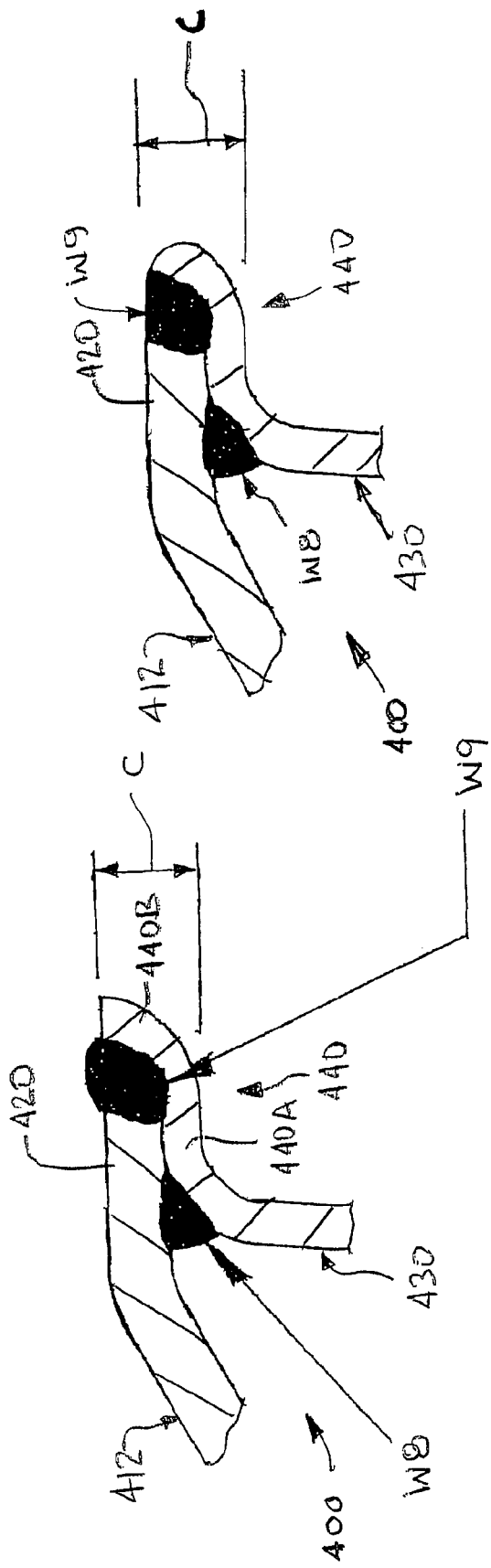

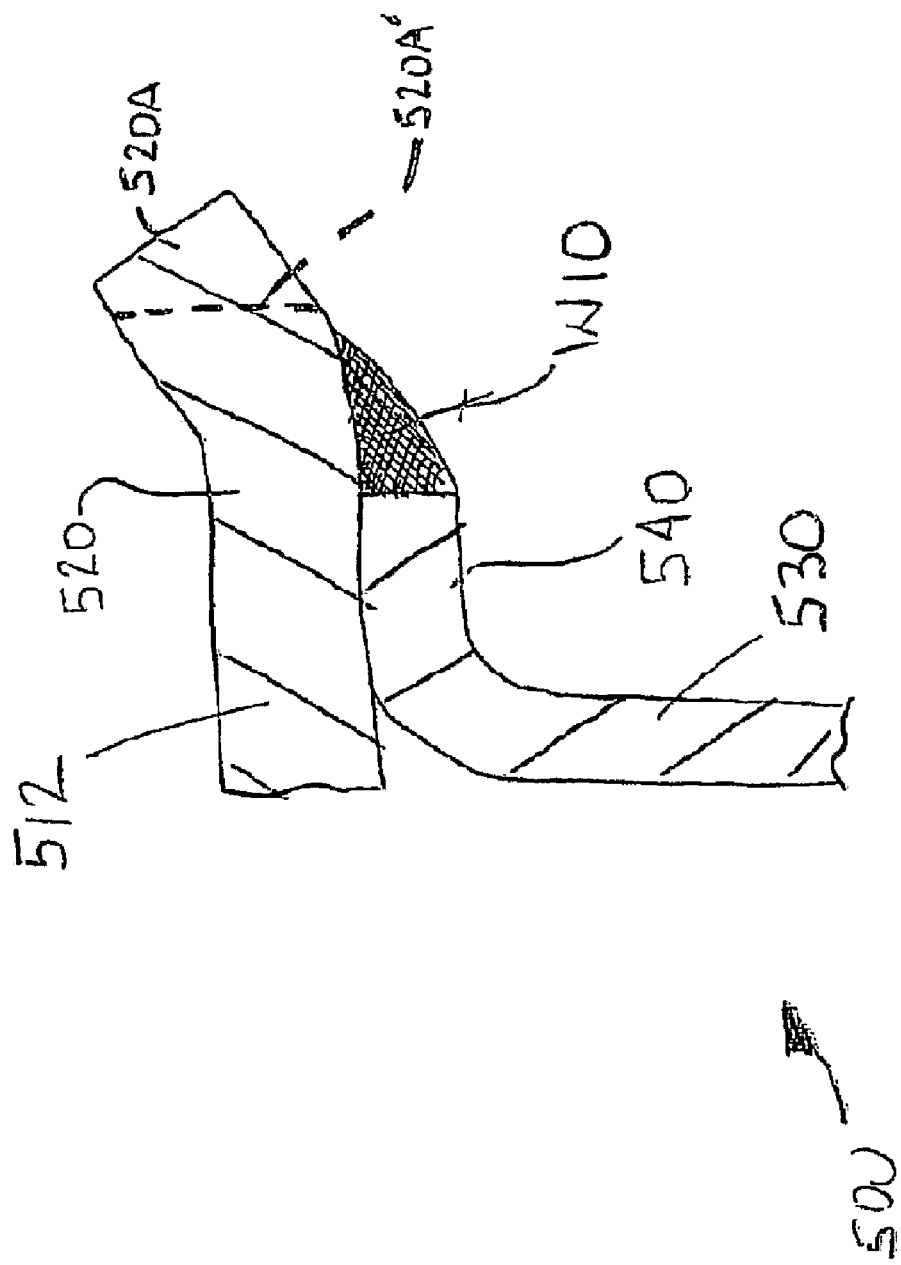

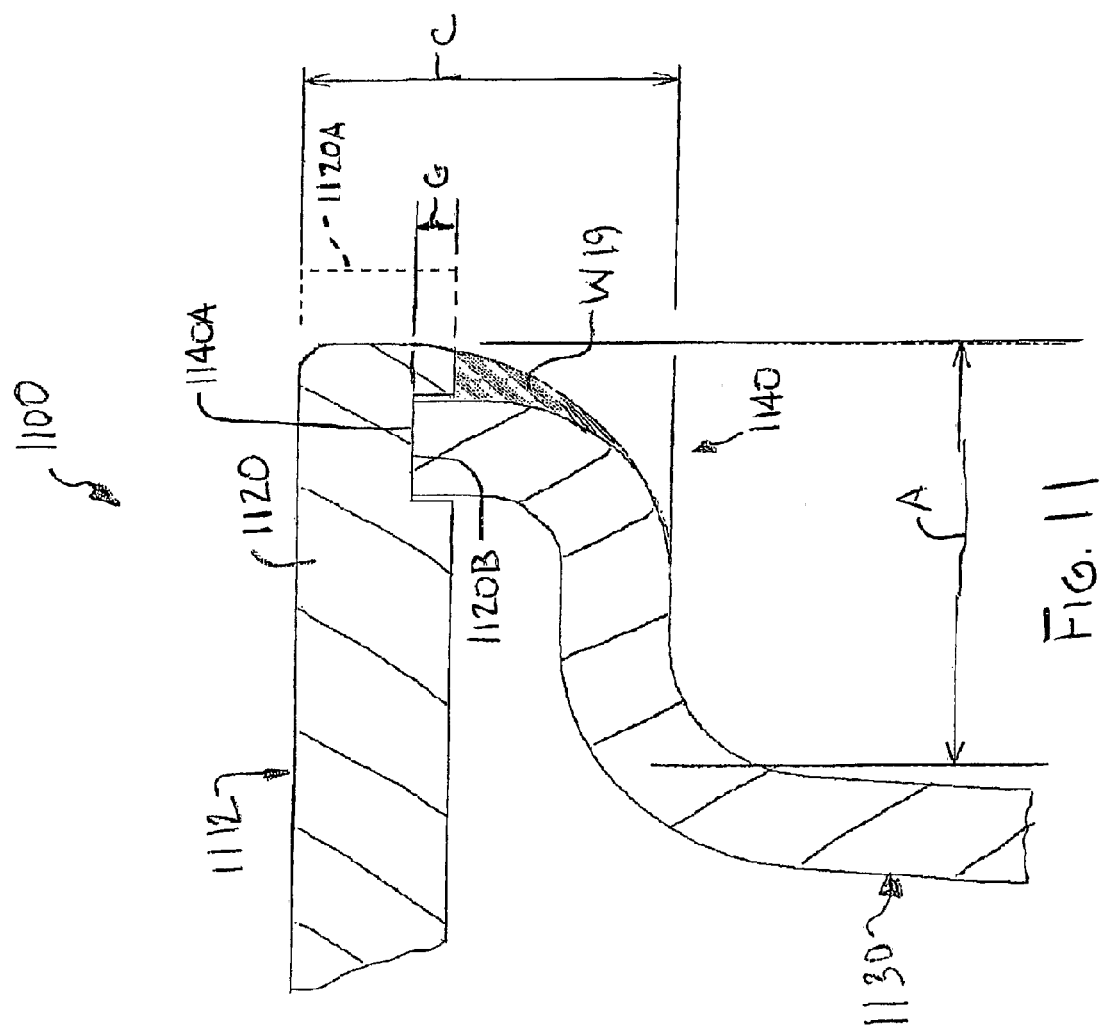

FABRICATED VEHICLE WHEEL AND METHOD FOR PRODUCING SAME

BACKGROUND OF THE INVENTION

This invention relates in general to vehicle wheels and in particular to an improved full face fabricated euroflange type of vehicle wheel and method for producing the same.

A conventional fabricated vehicle wheel is typically of a two-piece construction and includes an inner disc and an outer "full" rim. The disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the disc is used. In both types of constructions, the outer annular portion of the disc is typically secured to the rim by welding.

A conventional full face fabricated vehicle wheel is distinguished from other types of fabricated wheels by having a one-piece wheel disc construction. In particular, the full face wheel includes a "full face" disc and a "partial" rim. The full face disc can be formed cast, forged, or fabricated from steel, aluminum, or other alloys. The full face disc includes an inner annular wheel mounting portion and an outer annular portion which defines at least a portion of an outboard tire bead seat retaining flange of the wheel. The wheel mounting portion defines an inboard mounting surface and includes a center pilot or hub hole, and a plurality of lug receiving holes formed therethrough for mounting the wheel to an axle of the vehicle. The partial rim is fabricated from steel, aluminum, or other alloys, and includes an inboard tire bead seat retaining flange, an inboard tire bead seat, an axially extending well, and an outboard tire bead seat. In some instances, the outboard tire bead seat of the rim and the outer annular portion of the disc cooperate to form the outboard tire bead seat retaining flange of the full face wheel. In both types of constructions, the outboard tire bead seat of the rim is positioned adjacent the outer annular portion of the disc and a weld is applied to secure the rim and the disc together.

A typical euroflange type of vehicle wheel may be formed as a one piece cast wheel or may be as a two piece fabricated euroflange vehicle wheel having a cast outer disc and a full face wheel disc and a partial wheel rim, such as shown in U.S. Pat. No. 5,564,792 to Archibald. In both types of constructions, the wheel does not include an outboard tire bead seat retaining flange having a generally axially outwardly extending lip or portion capable of receiving a conventional wheel balance weight.

SUMMARY OF THE INVENTION

This invention relates to a full face fabricated euroflange type of vehicle wheel.

According to one embodiment, the full face fabricated euroflange vehicle wheel comprises a full face wheel disc defining an axis and formed from a suitable material, the wheel disc having an outer end; and a wheel rim formed from a suitable material and having an outer end joined to the outer end of the wheel disc by at least one weld to produce the fabricated euroflange vehicle wheel; wherein the fabricated euroflange vehicle wheel includes only a generally radially outwardly extending outer end formed by a combination of at least a portion of two of the outer end of the wheel disc, the outer end of the wheel rim and the at least one weld.

According to another embodiment, the method for producing a full face fabricated euroflange vehicle wheel comprising the steps of: (a) providing a full face wheel disc defining an axis and formed from a suitable material, the wheel disc having an outer end; and (b) providing a wheel rim formed from a suitable material and having an outer end; and (c) positioning the outer ends of the wheel disc and wheel rim in a predetermined position relative to each other; and (d) joining the wheel disc and the wheel rim together by at least one weld to produce the fabricated euroflange vehicle wheel, wherein the fabricated euroflange vehicle wheel includes only a generally radially outwardly extending outer end formed by a combination of at least a portion of two of the outer end of the wheel disc, the outer end of the wheel rim and the at least one weld.

According to yet another embodiment, the full face fabricated euroflange vehicle wheel comprises: a full face wheel disc defining an axis and formed from a suitable material, the wheel disc having an outer end defining a first thickness; and a wheel rim formed from a suitable material and having an outer end joined to the outer end of the wheel disc by at least one weld to produce the fabricated euroflange vehicle wheel, the outer end of said wheel rim defining a second thickness; wherein the fabricated euroflange vehicle wheel includes only a generally radially outwardly extending outer end having a predetermined thickness defined by a combination of the first thickness of the outer end of the wheel disc and the second thickness of the outer end of the wheel rim.

Other advantages of this invention will become apparent to those skilled in the art from the following detailed description of the invention, when read in light of the accompanying drawings.

BRIEF DESCRIPTION OF THE DRAWINGS

FIG. 1 is a view of a portion of a first embodiment of a full face fabricated euroflange type of vehicle wheel, showing the initial assembly operation.

FIG. 1B is a view of a portion of the vehicle wheel illustrated in FIG. 1, showing the wheel after the welding operation.

FIG. 1C is a view of a portion of the vehicle wheel illustrated in FIG. 1, showing the wheel after the machining operation.

FIG. 3A is a view of a portion of a third embodiment of a full face fabricated euroflange type of vehicle wheel, showing the wheel after the welding operation.

FIG. 3B is a view of a portion of the vehicle wheel illustrated in FIG. 3A, showing the wheel after the machining operation.

FIG. 4A is a view of a portion of a fourth embodiment of a full face fabricated euroflange type of vehicle wheel, showing the wheel after the welding operation.

FIG. 4B is a view of a portion of the vehicle wheel illustrated in FIG. 4A, showing the wheel after the machining operation.

FIG. 5 is a view of a portion of a fifth embodiment of a fall face fabricated euroflange type of vehicle wheel, showing the wheel after the welding operation.

FIG. 11 is a view of a portion of an eleventh embodiment of a full face fabricated euroflange type of vehicle wheel, showing the wheel after the welding and then the machining operation.

DETAILED DESCRIPTION OF THE PREFERRED EMBODIMENTS

Figure 1A:
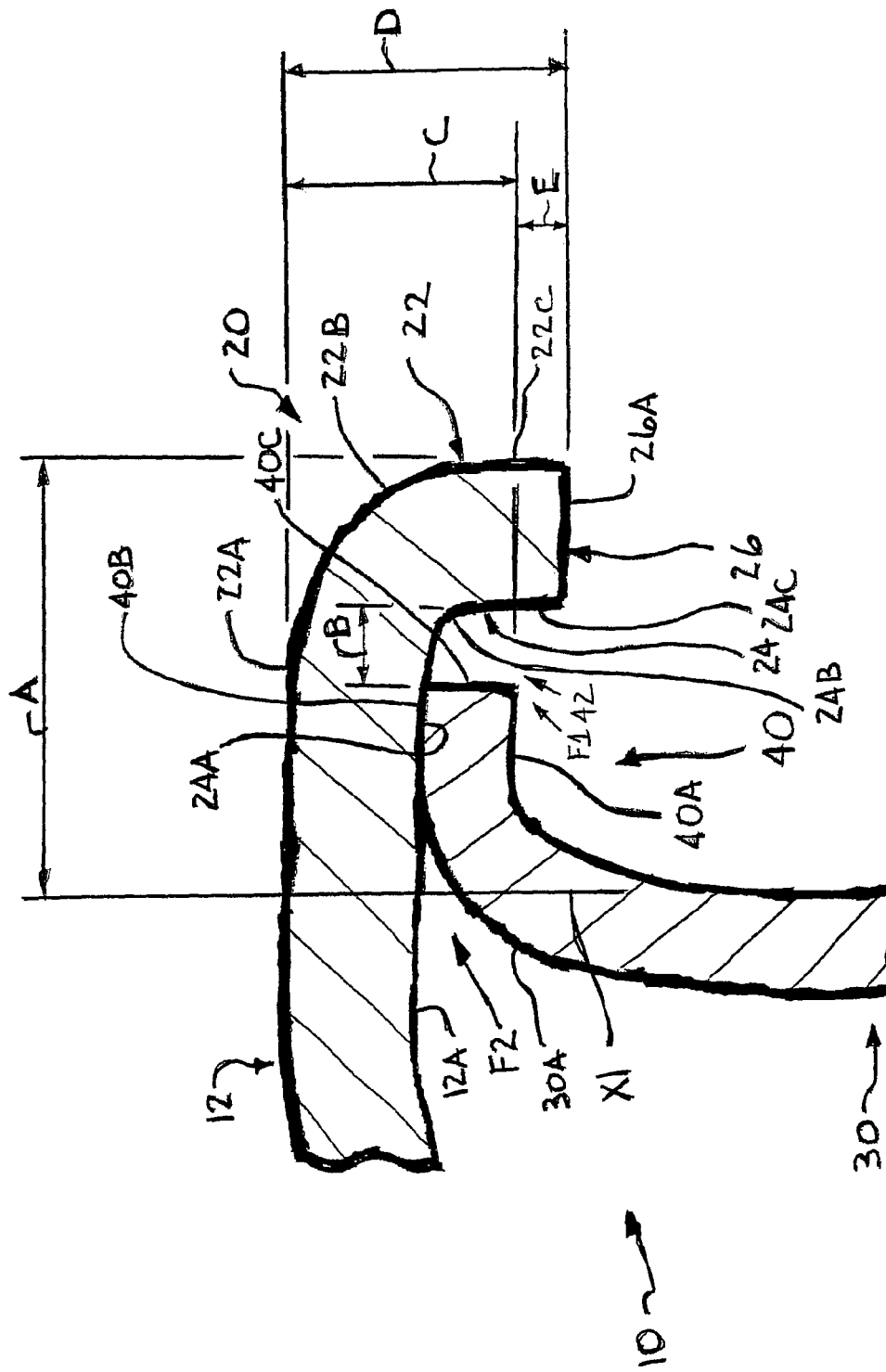
FIG. 1A is an enlarged view of a portion of the vehicle wheel illustrated in FIG. 1.

Referring now to the drawings, there is illustrated in FIG. 1 a first embodiment of a full face fabricated euroflange type of vehicle wheel, indicated generally at 10, and showing the initial assembly of the vehicle wheel. The vehicle wheel 10 can be of any suitable type of material or materials, such as for example, steel, aluminum and alloys thereof and, in accordance with the present invention as will be discussed below, is operative to produce a "euroflange" type of vehicle wheel, a portion of which is shown in FIG. 1B. As used herein, the term euroflange type of vehicle wheel means that the associated vehicle wheel does not include an outboard tire bead seat retaining flange having a generally axially outwardly extending lip or portion capable of receiving a conventional wheel balance weight. Although the present invention is illustrated and described in conjunction with the particular euroflange type of full face fabricated vehicle wheel constructions disclosed herein, it will be appreciated that the invention can be used in conjunction with other kinds of full face fabricated euroflange vehicle wheel constructions.

As shown in FIG. 1, the initial assembly of the vehicle wheel 10 includes the positioning of a wheel disc, indicated generally at 12, and a wheel rim, indicated generally at 30, relative to one another in a predetermined position. The wheel disc 12 can be of any suitable construction and in the illustrated embodiment the wheel disc 12 defines a wheel axis X and includes a center pilot hole 14, a plurality of lug bolt receiving holes 16 spaced around the pilot hole 14 (only one of such lug bolt receiving holes 16 illustrated in FIG. 1), a plurality of spokes 18, and an outer end, indicated generally at 20. The lug bolt receiving holes 16 receive lug bolts (not shown) and nuts (not shown) for securing the vehicle wheel 10 on an axle (not shown) of a vehicle. Alternatively, the construction, material and/or make-up of the wheel disc 12 may be other than illustrated if so desired.

In the illustrated embodiment, the outer end 20 of the wheel disc 12 is inverted or turned inwardly so as to extend generally axially inwardly toward the rim 30 (i.e., downwardly when viewed in FIG. 1), and generally parallel with respect to the wheel axis X. As best shown in FIG. 1A, the outer end 20 includes a first or outer surface 22, a second or inner surface 24, and a third or end surface 26. In the illustrated embodiment, the first surface 22 includes a first portion having a non-curved or generally straight outer surface 22A, a second portion having a curved or radiused outer surface 22B, and a third portion having a non-curved or generally straight outer surface 22C. The second surface 24 includes a first portion having a non-curved or generally straight outer surface 24A, a second portion having a curved or radiused outer surface 24B, and a third portion having a non-curved or generally straight outer surface 24C. The third surface 26 includes a generally straight outer surface 26A.

In the illustrated embodiment, the outer surfaces 22A, 24A and 26A of the surfaces 22, 24 and 26, respectively, are generally parallel to each other and generally perpendicular with respect to the wheel axis X. The outer surfaces 22C and 24C of the surfaces 22 and 24, respectively, are generally parallel with respect to each other and generally parallel with respect to the wheel axis X. Alternatively, the construction and/or make-up of outer end 20 of the wheel disc 12 may be other than illustrated if so desired.

The wheel rim 30 can be of any suitable type of construction and in the illustrated embodiment the wheel rim 30 includes an inboard tire bead seat retaining flange 32, an inboard tire bead seat 34, a well 36, an outboard tire bead seat 38, and an outer end, indicated generally at 40. In the illustrated embodiment, the end outer 40 of the wheel rim 30 is inverted or turned outwardly so as to extend generally radially outwardly (i.e., to the right when viewed in FIG. 1), and generally perpendicular with respect to the wheel axis X.

As best shown in FIG. 1A, the outer end 40 includes a first or outer surface 40A, a second or inner surface 40B, and a third or end surface 40C. In the illustrated embodiment, the outer surface 40A and the inner surface 40B of the outer end 40 are generally parallel to each other and generally perpendicular with respect to the wheel axis X, and the end surface 40C is generally parallel with respect to the wheel axis X. Alternatively, the construction and/or make-up of outer end 40 of the wheel rim 30 may be other than illustrated if so desired.

As shown in FIGS. 1 and 1A, the initial assembly of the disc 12 and the rim 30 preferably positions the outer surface 22C of the end 20 of the disc 12 a predetermined generally radial distance A from an axis X1 defined by outer surfaces of the bead seats 34 and 38. Preferably, in the illustrated embodiment, the distance A is approximately 17.50 mm. As a result of this, in the illustrated embodiment there is preferably defined gap or "weld receiving" pocket, indicated generally at 42, which extends a generally radial distance B between the end surface 40C of the outer end 40 of the rim 12 and the inner surface 24C of the end 20 of the disc 12 for a purpose to be discussed below.

Also, as shown in the illustrated embodiment, the initial assembly of the disc 12 and the rim 30 preferably positions the inner surface 22A of the end 20 of the disc 12 a predetermined generally axial distance C from the outer surface 40A of the rim 30. Preferably, the distance C is in the range from about 9 mm to about 14 mm. More preferably, the distance C is in the range from about 11 mm to about 13.5 mm.

Also, as shown in the illustrated embodiment, preferably a generally axial distance D is defined between the inner surface 22A of the end 20 of the disc 12 and the outer surface 26A of the end 20 of the disc. Preferably, as shown in the illustrated embodiment, the distance D is greater than the distance C so as to define an "overhang area" of the outer end 20 of the disc 12 which extends a predetermined generally axial distance E for a purpose to be discussed below. Alternatively, one or more of the distances A, B, C and/or D may be other than illustrated if so desired.

Following the initial assembly of the disc 12 and the rim 30 as shown in FIGS. 1 and 1A, the disc 12 and the rim 30 are joined together as shown in FIG. 1B. As shown therein, to accomplish this in the illustrated embodiment, welds W1 and W2 are provided to join the disc 12 and the rim 30 together. The first weld W1 is deposited in a first fit-up area, indicated generally at F1 in FIG. 1A, which is defined in the gap 42 by the respective surfaces 40C, 24A and 24C of the rim 30 and the disc 12, and the second weld W2 is deposited in a second fit-up area, indicated generally at F2 in FIG. 1A, which is defined by the respective surfaces 30A and 12A of the rim 30 and the disc 12. Alternatively, one or both of the welds W1 and W2 may be other than disclosed.

Following the welding of the disc 12 and the rim 30 as shown in FIG. 1A, an exposed outer portion or "weldment area" of the weld W1 is finish machined as shown in FIG. 1C. As shown therein, during the finish machining operation, the overhang portion of the outer end 20 of the disc 12 is preferably also machined along with the outer portion of the weld W1 so as to be generally in the same plane or generally flat with the outer surface 40A of the end 40 of the rim 30. As a result of this, the wheel 10 is provided with a finished generally radially outwardly extending outboard end or lip, indicated generally at 50 in FIG. 1C, having a generally constant or uniform outer surface 50A along the associated surfaces of the end 40 of the rim 30, the weld W1, and the end 20 of the disc 12 and is operative to generally maintain the distance C between the outer surface 22A of the end 20 of the disc 12 and the outer surfaces 40A and 50A of the rim and the wheel 10, respectively. It is preferred that outer surface 50A be generally smooth (i.e., no bumps or edges), to thereby accommodate the associated tire. Also, while in the illustrated embodiment the surfaces 12A and 50A are shown as being generally parallel with respect to one another, one or both of the surfaces 22A and 50A can be non-parallel (i.e., angled).

Figure 2:
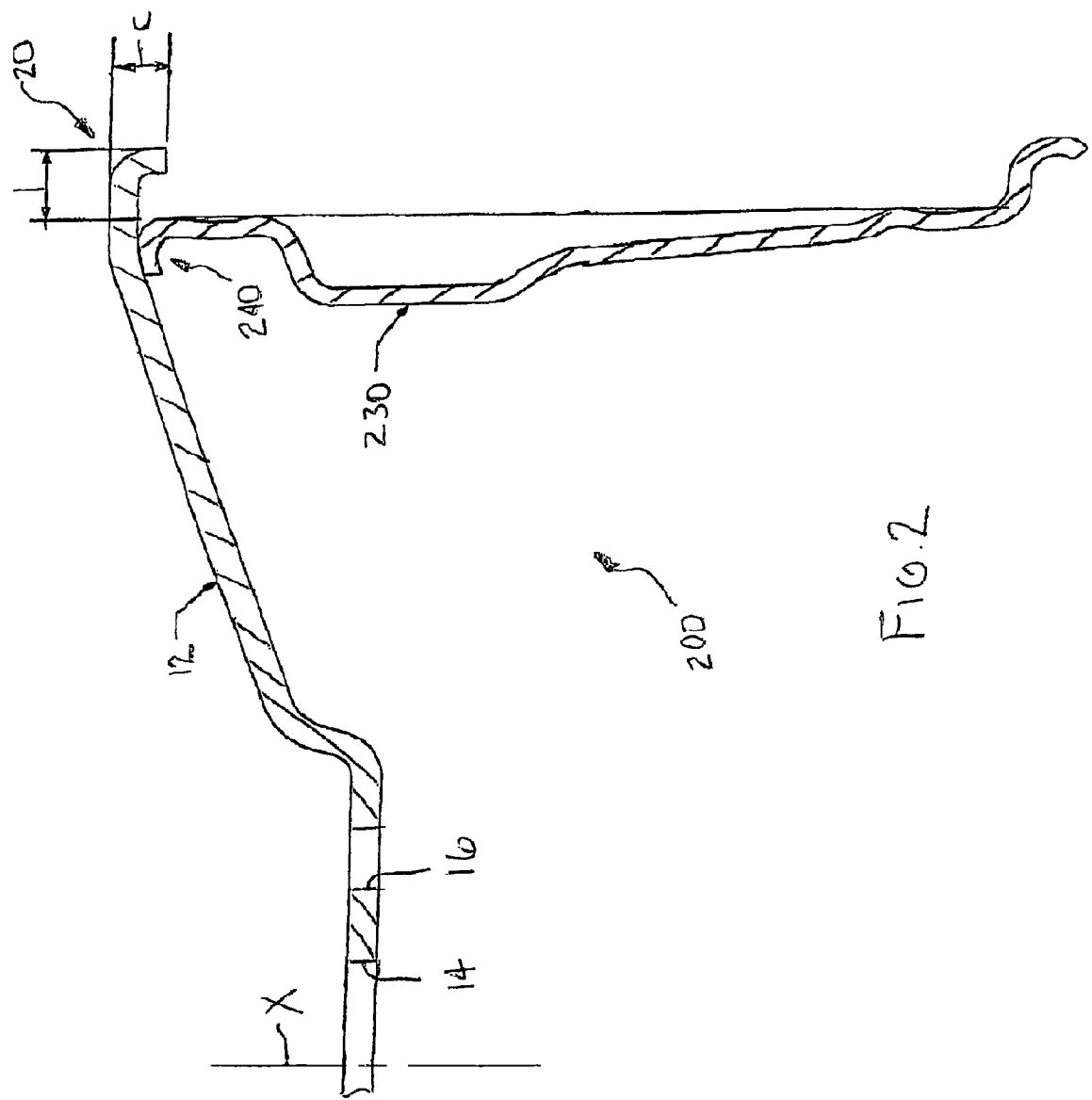
FIG. 2 is a view of a portion of a second embodiment of a full face fabricated euroflange type of vehicle wheel, showing the initial assembly operation.
Figure 2B:
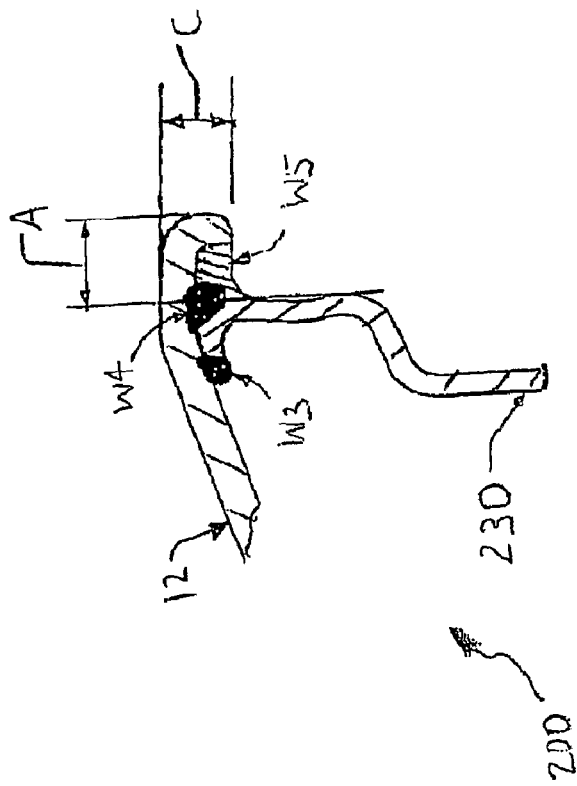
FIG. 2B is a view of a portion of the vehicle wheel illustrated in FIG. 2, showing the wheel after the machining operation.
Figure 2A:
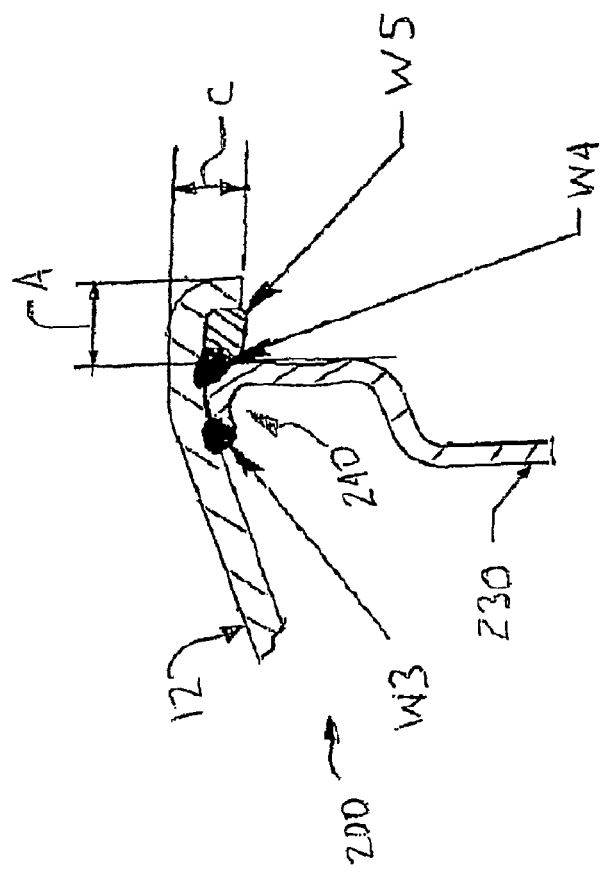
FIG. 2A is a view of a portion of the vehicle wheel illustrated in FIG. 2, showing the wheel after the welding operation.

Referring now to FIGS. 2, 2A and 2B and using like reference numbers to indicate corresponding parts or elements, there is illustrated a second embodiment of a full face fabricated euroflange type of vehicle wheel, indicated generally at 200. In this embodiment, a wheel rim 230 includes an outer end 240 which is inverted or turned inwardly so as to extend generally radially inwardly (i.e., to the left when viewed in FIG. 2), and generally perpendicular with respect to a wheel axis X. In the illustrated embodiment, the outer ends 240 and 20 are disposed adjacent one another in a predetermined position and a first inner weld W3, a second outer weld W4, and a third outer weld W5 are used to join the rim 230 and the disc 12 together. The welds W3 and W4 may be similar to the welds W1 and W2 of the first embodiment.

In addition, in this embodiment, the outer end 20 of the disc 12 preferably does not have the overhang portion like in the first embodiment of FIGS. 1 and 1A-1C; however, the outer end 20 of this embodiment may have the overhang portion like in the first embodiment if so desired. Also, while the two separate outer welds W4 and W5 are preferred due to the weld W4 being a "penetrating" type of weld adapted to join the rim and disc together and the weld W5 being a "filler" type weld, a single outer weld may be used if so desired.

Referring now to FIGS. 3A and 3B and using like reference numbers to indicate corresponding parts or elements, there is illustrated a third embodiment of a full face fabricated euroflange type of vehicle wheel, indicated generally at 300. In this embodiment, a rim 330 includes a generally flat outer end 340 and a disc 312 includes a generally flat outer end 320. In the illustrated embodiment, the outer ends 340 and 320 are disposed adjacent one another in a predetermined position and a first inner weld W6 and a second outer weld W7 are used to join the rim 330 and the disc 312 together.

Referring now to FIGS. 4A and 4B and using like reference numbers to indicate corresponding parts or elements, there is illustrated a fourth embodiment of a full face fabricated euroflange type of vehicle wheel, indicated generally at 400. In this embodiment, a rim 430 includes a generally S-shaped outer end 440 having a first portion 440A which extends in a generally radially outwardly direction and a second portion 440B which extends in a generally axially outwardly direction, and a disc 412 includes a generally flat outer end 420. In the illustrated embodiment, the outer ends 440 and 420 are disposed adjacent one another in a predetermined position and a first inner weld W8 and a second outer weld W9 are used to join the rim 430 and the disc 412 together.

Referring now to FIG. 5 and using like reference numbers to indicate corresponding parts or elements, there is illustrated a fifth embodiment of a full face fabricated euroflange type of vehicle wheel, indicated generally at 500. In this embodiment, a rim 530 includes a generally inverted or turned radially outwardly extending outer end 540 and a disc 512 includes a generally flat outer end 520 having a radially extending outwardly turned outer end portion 520A. Alternatively, the outer end 520 can have an outer end portion 520A', as shown in phantom in FIG. 5.

In the illustrated embodiment, preferably a first or outer weld W10 is used to join the rim 530 and the disc 512 together. Alternatively, a second or an inner weld (not shown), may also be provided to join the rim 530 and disc 512 together. In the embodiment of FIG. 5 (as well as the embodiments of FIGS. 6 and 7), the outer end of the wheel following the machining operation thereof is not shown but it is understood that such outer end may be machined in a manner similar to that described and illustrated above in connection with the embodiments of FIGS. 1 to 4.

Figure 6A:
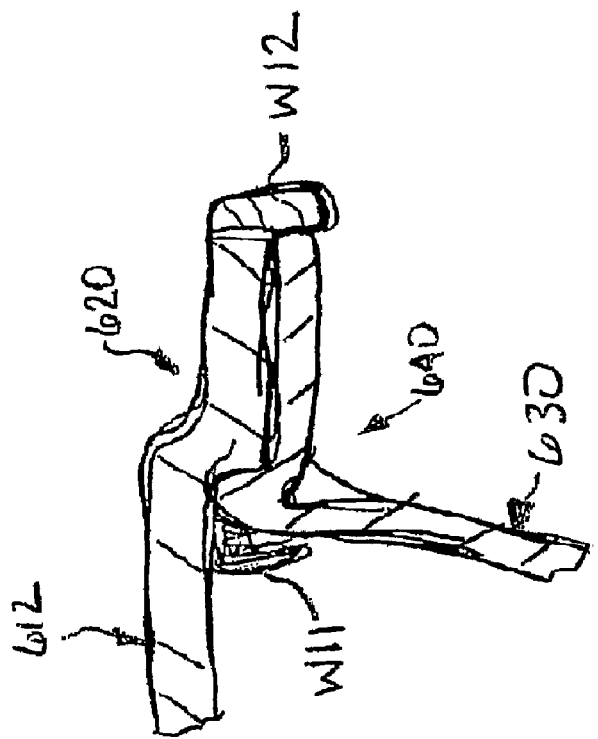
FIG. 6A is a view of a portion of a sixth embodiment of a full face fabricated euroflange type of vehicle wheel, showing the wheel after the welding operation.
Figure 6B:
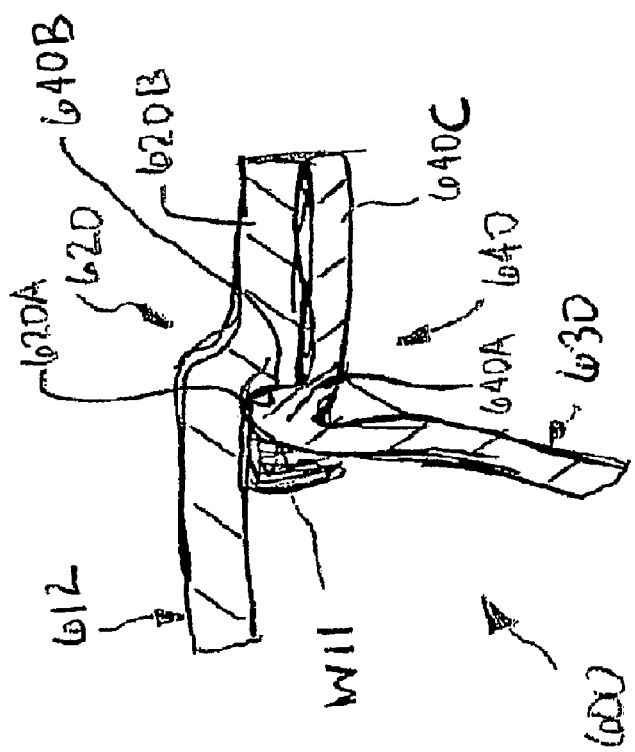
FIG. 6B is a view similar to FIG. 6A, showing an alternate embodiment of the wheel illustrated in FIG. 6A after the welding operation.

Referring now to FIG. 6A and using like reference numbers to indicate corresponding parts or elements, there is illustrated a sixth embodiment of a full face fabricated euroflange type of vehicle wheel, indicated generally at 600. In this embodiment, a rim 630 includes an outer end 640 having a turned back portion 640A which provides an outer shoulder 640B and a generally flat portion 640C, and a disc 612 includes a stepped outer end 620 which provides an inner shoulder 620A and a generally flat portion 620B. In the illustrated embodiment, the outer ends 640 and 620 are disposed adjacent one another in a predetermined position (e.g., with the respective shoulders 640A and 620A contacting each other), and a first inner weld W11 is used to join the rim 630 and the disc 612 together. Alternatively, as shown FIG. 6B, a second outer weld W12 may also be used to join the rim 630 and the disc 612 together if so desired.

Figure 7:
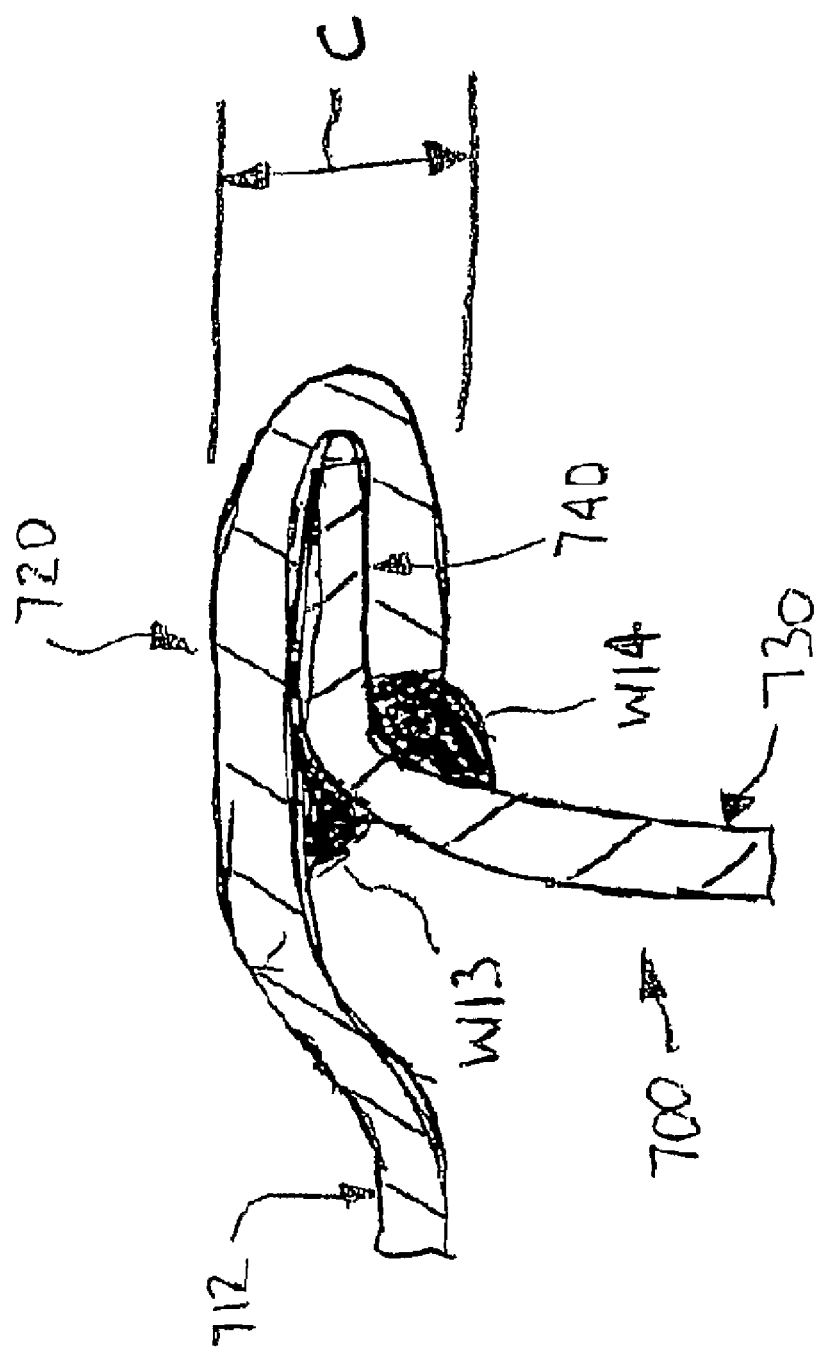
FIG. 7 is a view of a portion of a seventh embodiment of a full face fabricated euroflange type of vehicle wheel, showing the wheel after the welding operation.

Referring now to FIG. 7 and using like reference numbers to indicate corresponding parts or elements, there is illustrated a seventh embodiment of a full face fabricated euroflange type of vehicle wheel, indicated generally at 700. In this embodiment, a rim 730 includes a generally flat outer end 740 and a disc 712 includes a reverse-curled or generally U-shaped outer end 720. In the illustrated embodiment, the outer ends 740 and 720 are disposed adjacent one another in a predetermined position and a first inner weld W13 and a second outer weld W14 are used to join the rim 730 and the disc 712 together.

Figure 8:
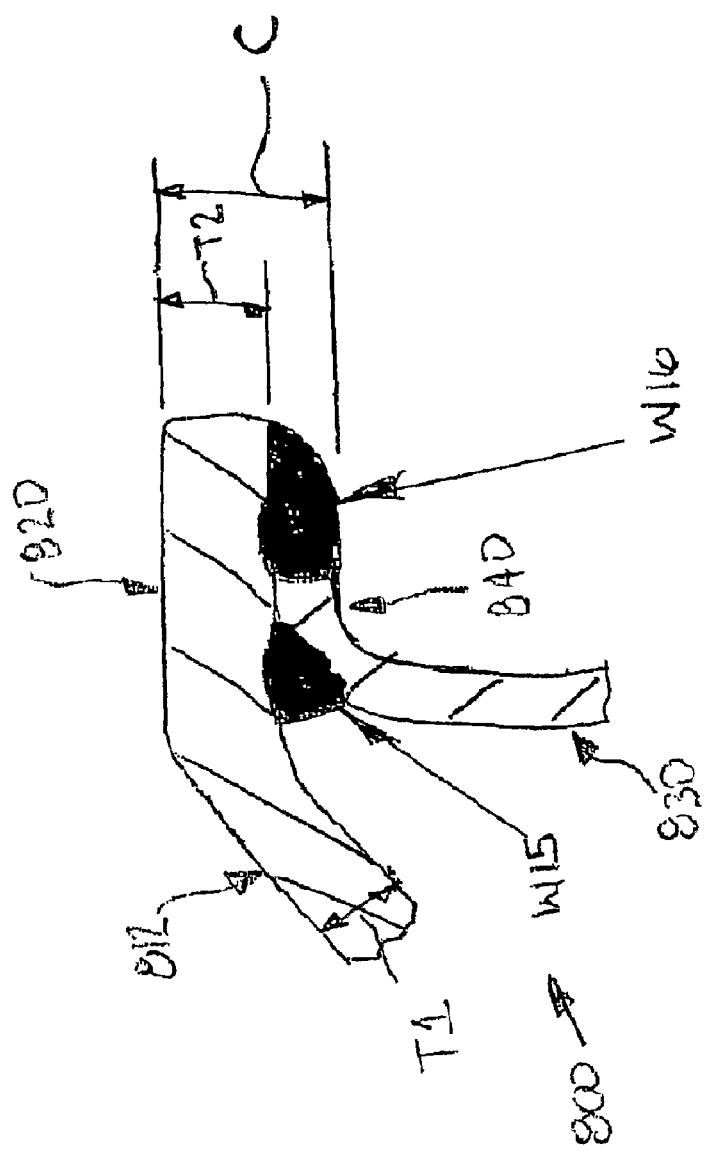
FIG. 8 is a view of a portion of an eighth embodiment of a full face fabricated euroflange type of vehicle wheel, showing the wheel after the welding operation and the machining operation.

Referring now to FIG. 8 and using like reference numbers to indicate corresponding parts or elements, there is illustrated an eighth embodiment of a full face fabricated euroflange type of vehicle wheel, indicated generally at 800. In this embodiment, a rim 830 includes a generally flat outer end 840 and a disc 812 includes a generally flat outer end 820 having an increased thickness T2 therein compared to a thickness T1 generally defined by the remainder of the disc. For example, if the distance C of about 12 mm is desired, the outer end 840 of the rim 830 could be approximately 4 mm thick, thickness T2 could be approximately 8 m and thickness T1 could be approximately 4 mm. Alternatively, the thicknesses of one or both of the rim 830 and/or the disc 812 may be other than disclosed if so desired. In the illustrated embodiment, the outer ends 840 and 820 are disposed adjacent one another in a predetermined position and a first inner weld W15 and a second outer weld W16 are used to join the rim 830 and the disc 812 together.

Figure 9:
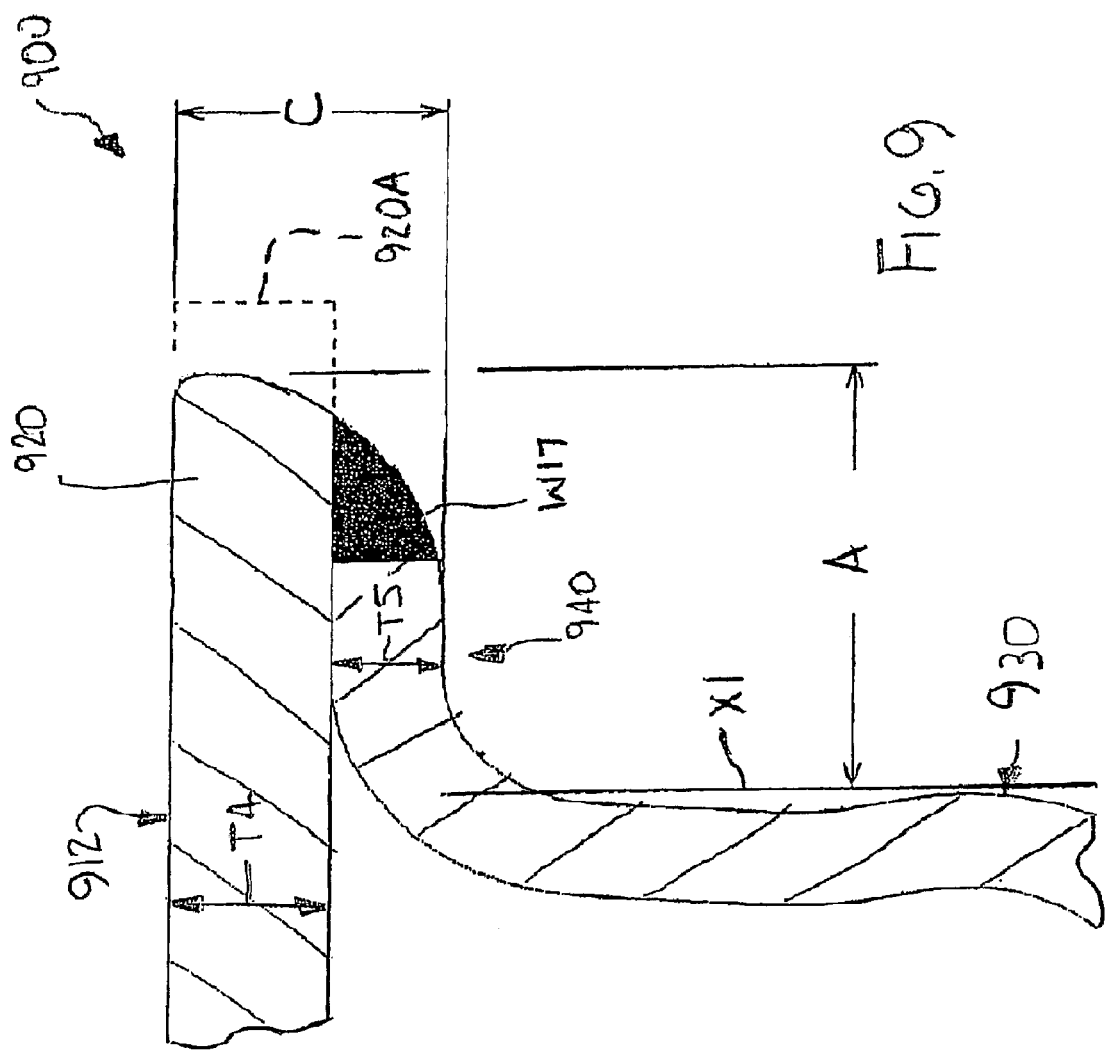
FIG. 9 is a view of a portion of a ninth embodiment of a full face fabricated euroflange type of vehicle wheel, showing the wheel after the welding and then the machining operation.

Referring now to FIG. 9 and using like reference numbers to indicate corresponding parts or elements, there is illustrated a ninth embodiment of a full face fabricated euroflange type of vehicle wheel, indicated generally at 900. In this embodiment, a rim 930 includes a generally flat outer end 940 and a disc 912 includes a generally flat outer end 920 having an increased thickness T4 compared to a thickness T5 of the rim 30. For example, if the distance C of about 12 mm is desired, the thickness T4 could be approximately 8 m and thickness T5 could be approximately 4 mm. Alternatively, the thicknesses of one or both of the rim 30 and/or the disc 12 can be other than disclosed if so desired.

In the illustrated embodiment, the outer ends 940 and 920 are disposed adjacent one another in a predetermined position and a first outer weld W17 is used to join the rim 930 and the disc 912 together. Alternatively, a second inner weld (not shown) may also be used to join the rim 930 and the disc 912 together if so desired. Also, the outer end of the disc 912 prior to the machining operation may have a profile as shown in phantom at 920A in FIG. 9.

Figure 10:
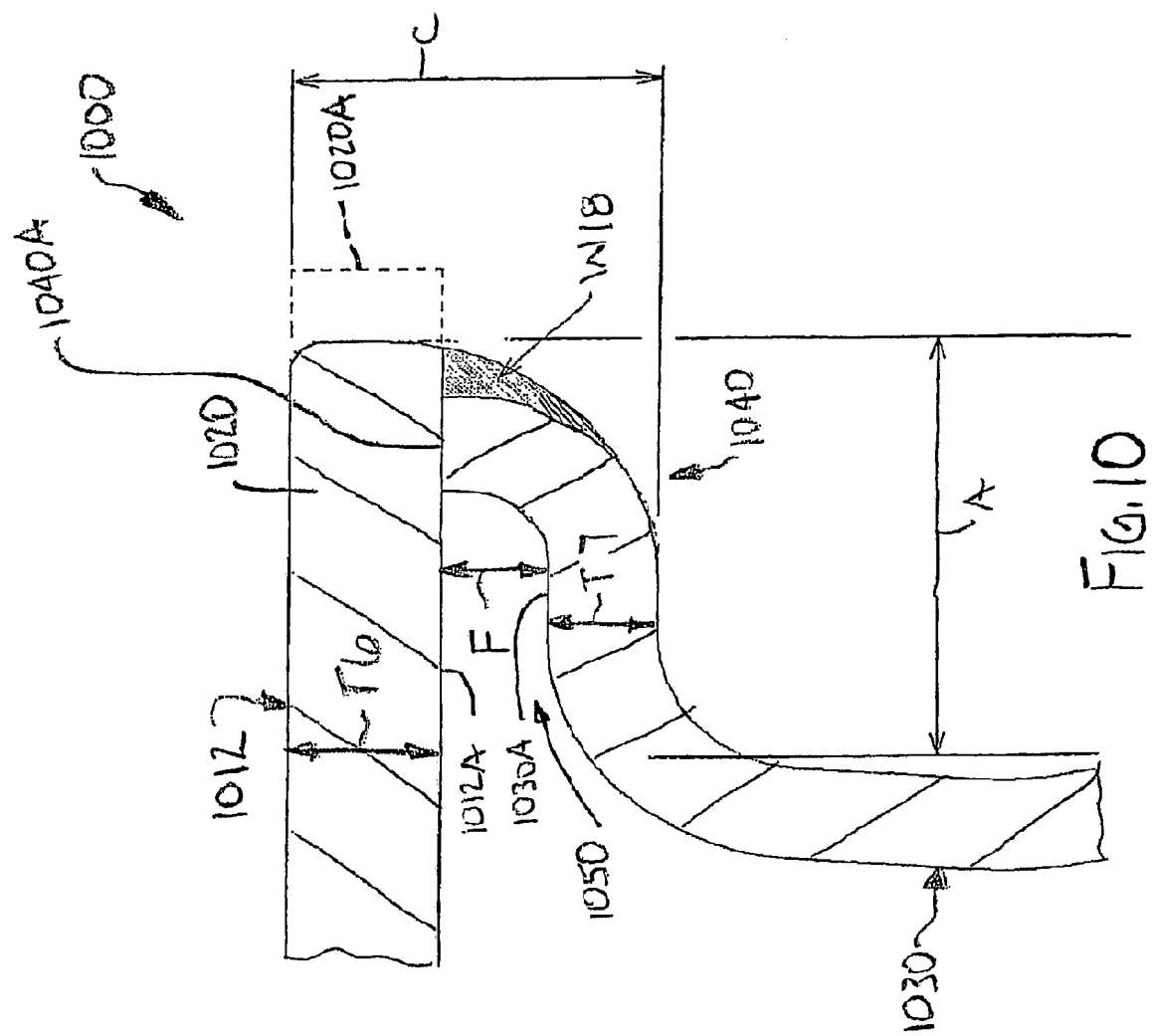
FIG. 10 is a view of a portion of a tenth embodiment of a full face fabricated euroflange type of vehicle wheel, showing the wheel after the welding and then the machining operation.

Referring now to FIG. 10 and using like reference numbers to indicate corresponding parts or elements, there is illustrated a tenth embodiment of a full face fabricated euroflange type of vehicle wheel, indicated generally at 1000. In this embodiment, a rim 1030 includes a reversed or curled outer end 1040 and a disc 1012 includes a generally flat outer end 1020 having an increased thickness T6 compared to a thickness T7 of the rim 30.

Also, in this embodiment, a remote end or end face 1040A of the outer end 1040 of the rim 1030 contacts the disc 1012 so that a gap, indicated generally at 1050, having a generally axial distance F is defined between respective opposed adjacent surfaces 1030A and 1012A of the rim 1030 and the disc 1012. For example, if the distance C of about 13.5 mm is desired, the thickness T6 could be approximately 6 m, the thickness T7 could be approximately 4 mm and the distance F of the gap 1050 could be approximately 3.5 mm. Alternatively, the thicknesses of one or both of the rim 1030 and/or the disc 1012 may be other than disclosed and/or the distance F of the gap 1050 can be other than disclosed if so desired.

In the illustrated embodiment, the outer ends 1040 and 1020 are disposed adjacent one another in a predetermined position and a first outer weld W18 is used to join the rim 1030 and the disc 1012 together. Alternatively, a second inner weld (not shown), which would be deposited in the gap 1050, may also be used to join the rim 1030 and the disc 1012 together if so desired. Also, the outer end 1020 of the disc 1012 prior to the machining operation may have a profile as shown in phantom at 1020A in FIG. 10.

Referring now to FIG. 11 and using like reference numbers to indicate corresponding parts or elements, there is illustrated an eleventh embodiment of a full face fabricated euroflange type of vehicle wheel, indicated generally at 1100. This embodiment is similar to the embodiment shown in FIG. 10 except that an outer end 1120 of a disc 1112 includes a groove 1120B formed therein adapted to receive a remote end 1140A of an outer end 1140 of a rim 1130. The groove 1120B extends a predetermined axial depth G.

In the illustrated embodiment, the outer ends 1140 and 1120 are disposed adjacent one another in a predetermined position and a first outer weld W19 is used to join the rim 1130 and the disc 1112 together. Alternatively, a second inner weld (not shown) may also be used to join the rim 1130 and the disc 1112 together if so desired. Also, the outer end 1120 of the disc 1112 prior to the machining operation may have a profile as shown in phantom at 1120A in FIG. 11.

One advantage of the present invention is that a full face fabricated euroflange type of vehicle wheel may be manufactured without having to use a casting method to produce a cast wheel disc of the associated known euroflange vehicle wheel.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A full face fabricated euroflange vehicle wheel comprising:
   a full face wheel disc defining a horizontal axis and having an outer end; and
   a wheel rim formed from a suitable material and having an outer end joined to said outer end of said wheel disc by at least one weld to produce the fabricated euroflange vehicle wheel;
   wherein the fabricated euroflange vehicle wheel includes only a generally radially outwardly extending outer end formed by a combination of at least a portion of two of said outer end of said wheel disc, said outer end of said wheel rim and said at least one weld and thereby is not configured to provide an outboard tire bead seat retaining flange having a generally axially outwardly extending portion;
   wherein said outer end of said wheel disc is turned inwardly and extends generally axially inwardly toward said wheel rim and generally parallel with respect to said axis and includes an inner surface which is spaced apart from a surface of said outer end of said wheel rim to define a weld receiving pocket between said inner surface of the said outer end of said wheel disc and said surface of said outer end of said wheel rim for receiving said at least one weld therein to thereby secure said wheel disc and said wheel rim together.

2. The full face fabricated euroflange vehicle wheel of claim 1 wherein said outer end of said wheel rim is joined to said outer end of said wheel disc by two welds.

3. The full face fabricated euroflange vehicle wheel of claim 1 wherein said outer end of said wheel rim is joined to said outer end of said wheel disc by three welds.

4. The full face fabricated euroflange vehicle wheel of claim 1 wherein said generally radially outwardly extending outer end is formed by at least a portion of said outer end of said wheel disc, said outer end of said wheel rim and said at least one weld.

5. The full face fabricated euroflange vehicle wheel of claim 1 wherein said outer end of said wheel rim is turned radially outwardly so as to extend generally perpendicular with respect to said axis.

6. The full face fabricated euroflange vehicle wheel of claim 1 wherein said outer end of said wheel rim is turned radially inwardly so as to extend generally perpendicular with respect to said axis.

7. The full face fabricated euroflange vehicle wheel of claim 1 wherein said outer end of said wheel disc defines a first thickness and said outer end of said wheel rim defines a second thickness which is less than said first thickness.

8. The full face fabricated euroflange vehicle wheel of claim 1 wherein said wheel rim and said wheel disc are formed from steel.

9. A method for producing a full face fabricated euroflange vehicle wheel comprising the steps of:
 (a) providing a full face wheel disc defining a horizontal axis and having an outer end;
 (b) providing a wheel rim having an outer end;
 (c) positioning the outer ends of the wheel disc and wheel rim in a predetermined position relative to each other; and
 (d) joining the wheel disc and the wheel rim together by at least one weld to produce the fabricated euroflange vehicle wheel, wherein the fabricated euroflange vehicle wheel includes only a generally radially outwardly extending outer end formed by a combination of at least a portion of two of the outer end of the wheel disc, the outer end of the wheel rim and the at least one weld and thereby is not configured to provide an outboard tire bead seat retaining flange having a generally axially outwardly extending portion, and wherein the outer end of the wheel disc is turned inwardly and extends generally axially inwardly toward the wheel rim and generally parallel with respect to the axis and includes an inner surface which is spaced apart from a surface of the outer end of the wheel rim to define a weld receiving pocket between the inner surface of the outer end of the wheel disc and the surface of the outer end of the rim for receiving the at least one weld therein to thereby secure the wheel disc and the wheel rim together.

10. The method of claim 9 wherein step (d) includes joining the wheel disc and the wheel rim together by two welds.

11. The method of claim 9 wherein the outer end of the wheel rim provided in step (b) is turned radially outwardly so as to extend generally perpendicular with respect to the axis in step (c).

12. The method of claim 9 wherein the outer end of the wheel rim provided in step (b) is turned radially inwardly so as to extend generally perpendicular with respect to the axis in step (c).

13. The method of claim 9 wherein the outer end of the wheel rim provided in step (b) defines a first thickness and the outer end of the wheel disc provided in step (a) defines a second thickness which is greater than the first thickness.

14. The method of claim 9 wherein the wheel disc provided in step (a) is formed from steel and the wheel rim provided in step (b) is formed from steel.

15. A full face fabricated euroflange vehicle wheel comprising:
 a full face wheel disc defining a horizontal axis and having an outer end defining a first thickness; and
 a wheel rim formed having an outer end joined to said outer end of said wheel disc by at least one weld to produce the fabricated euroflange vehicle wheel, said outer end of said wheel rim defining a second thickness;
 wherein the fabricated euroflange vehicle wheel includes only a generally radially outwardly extending outer end which extends generally perpendicular with respect to said axis and which has a predetermined thickness defined by a combination of said first thickness of said outer end of said wheel disc and said second thickness of said outer end of said wheel rim and thereby is not configured to provide an outboard tire bead seat retaining flange having a generally axially outwardly extending portion; and
 wherein said outer end of said wheel disc is turned inwardly and extends generally axially inwardly toward said wheel rim and generally parallel with respect to said axis and includes an inner surface which is spaced apart from a surface of said outer end of said wheel rim to define a weld receiving pocket between said inner surface of the said outer end of said wheel disc and said surface of said outer end of said wheel rim for receiving said at least one weld therein to thereby secure said wheel disc and said wheel rim together.

16. The full face fabricated euroflange vehicle wheel of claim 15 wherein said first thickness of said outer end of said wheel disc is greater than said second thickness of said outer end of said wheel rim.

17. The full face fabricated euroflange vehicle wheel of claim 15 wherein said wheel rim and said wheel disc are formed from steel.

* * * * *